United States Patent
Casey et al.

(10) Patent No.: US 6,256,408 B1
(45) Date of Patent: Jul. 3, 2001

(54) SPEED AND RECOGNITION ENHANCEMENT FOR OCR USING NORMALIZED HEIGHT/WIDTH POSITION

(75) Inventors: Richard G. Casey, Morgan Hill, CA (US); Hiroyasu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/234,525

(22) Filed: Apr. 28, 1994

(51) Int. Cl.⁷ .................................................. G06K 9/62
(52) U.S. Cl. ............................. 382/170; 382/224
(58) Field of Search ............................. 382/13, 10, 19, 382/30, 34, 36, 168, 169, 170, 171, 172, 190, 192, 224, 187, 195

(56) References Cited

U.S. PATENT DOCUMENTS

| | | | |
|---|---|---|---|
| 3,781,799 | * 12/1973 | Robinson | 382/41 |
| 3,921,136 | 11/1975 | Bar-Lev | 340/146.3 |
| 4,030,068 | * 6/1977 | Banz | 382/30 |
| 4,769,851 | * 9/1988 | Nishijima et al. | 382/34 |
| 4,860,376 | 8/1989 | Tanka et al. | 382/57 |
| 4,897,880 | 1/1990 | Wilber et al. | 382/13 |
| 5,060,290 | * 10/1991 | Kelly et al. | 382/170 |
| 5,138,668 | * 8/1992 | Abe | 382/13 |
| 5,253,303 | * 10/1993 | Nishijama et al. | 382/13 |
| 5,373,566 | * 12/1994 | Murdock | 382/9 |
| 5,396,566 | * 3/1995 | Bruce et al. | 382/13 |

FOREIGN PATENT DOCUMENTS

| | | | |
|---|---|---|---|
| 0 332 471 | 9/1989 | (EP) | G06K/9/68 |
| 0 457 534 | 11/1991 | (EP) | G06K/9/68 |

OTHER PUBLICATIONS

R.J. Baumgartner, "Upper/Lower Case Decision for Character Readers", IBM Technical Disclosure Bulletin, vol. 14, No. 11 (Apr. 1972); pp. 3493–3494.

* cited by examiner

*Primary Examiner*—Jon Chang
(74) *Attorney, Agent, or Firm*—Baker, Maxham, Jester & Meador (57) ABSTRACT

An automated optical character recognition method is provided for use in conjunction with a programmable digital processing device. The method inputs a sequence of values representing one or more characters in an array of characters to be optically recognized. The values define one or more dimensional characteristics of the characters. From the input values, a standard dimensional value is determined from a frequency distribution of a selected one of the character dimensional characteristics. For each of the input characters, a set of normalized values is determined from the standard dimensional value. The normalized values correspond to the one or more character dimensional characteristics. Optical character recognition is thereafter performed using the normalized values.

43 Claims, 5 Drawing Sheets

SPEED AND RECOGNITION ENHANCEMENT FOR OCR USING NORMALIZED HEIGHT/WIDTH POSITION

BACKGROUND OF THE INVENTION

The present invention is directed generally to optical character recognition, and more particularly, to automated methods and apparatus for reducing recognition errors, especially those resulting from an inability to distinguish between upper and lower case characters, or other characters of similar shape but dissimilar size or position.

Programmable computers and digital processing apparatus have proven useful for optical character recognition in which visual character indicia, such as printed text, are scanned, identified and assigned a character code value that can be stored electronically. A word processing "document" is one example of a data file containing character code values which a computer is able to interpret and reproduce in human-readable form on a CRT or as a printed document. There are many character code conventions in use today, the most common being the ASCII (American Standard Code for Information Interchange) code system.

Many existing optical character recognition systems make recognition errors between characters that are very similar in shape but are of different size or located at different positions. Upper and lowercase characters (S/s) and apostrophes and commas ('/,), for example, are prone to such errors. No matter how similar the shapes, their size or position is usually so different that this kind of error must be avoided.

Although some optical character recognition systems utilize information on size and position for discrimination, they still suffer from recognition errors, particularly when encountering the many kinds of electronic fonts currently in use. Thus, it would be desirable to provide a system that utilizes size and position information in a fashion that enhances the speed and recognition rate of optical character recognition.

SUMMARY OF THE INVENTION

In accordance with the foregoing objectives, an automated optical character recognition method of novel design is provided for use in conjunction with a programmable digital processing device. The method inputs a sequence of values representing one or more characters in an array of characters to be optically recognized. The input values define one or more dimensional characteristics of the characters. From the input values, a standard dimensional value is determined from a frequency distribution of a selected one of the character dimensional characteristics. For each of the input characters, a set of normalized values is determined from the standard dimensional value. The normalized values correspond to the one or more character dimensional characteristics. Optical character recognition is thereafter performed using the normalized values.

BRIEF DESCRIPTION OF THE PREFERRED EMBODIMENTS

The objects, advantages and features of the present invention will be more clearly understood by reference to the following detailed disclosure and the accompanying drawing in which.

DETAILED DESCRIPTION OF THE PREFERRED EMBODIMENTS

Figure 1:
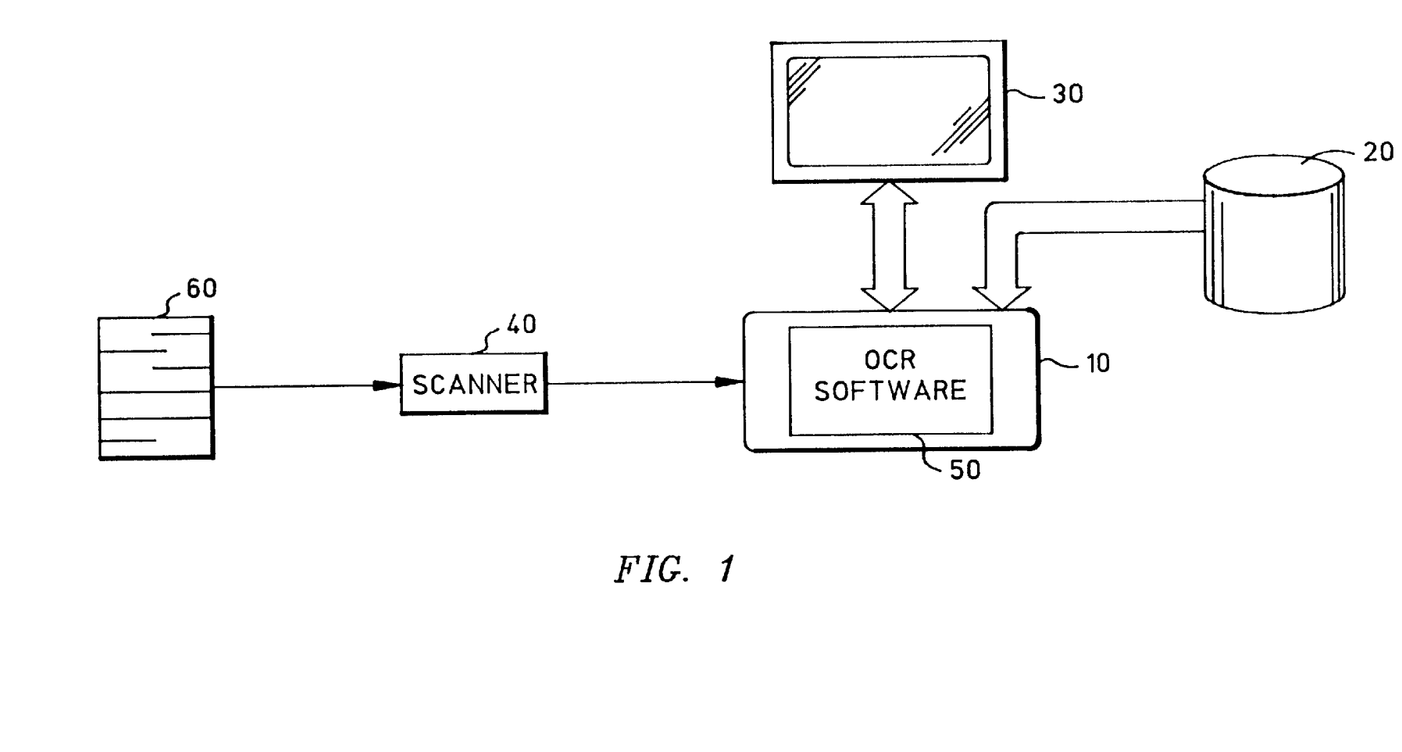
FIG. 1 is a block diagram of an automated optical character recognition system constructed in accordance with the present invention.

Referring now to FIG. 1, optical character recognition in accordance with the present invention may be performed by the illustrated data processing apparatus, which includes a programmable computer 10 having a keyboard (not shown), a data storage resource 20, a display monitor 30 and an optical scanning device 40. These components are conventionally known and may include a wide variety of component types and system arrangements. The data processing apparatus is controlled by an OCR software system 50 which is resident during program operation in random access memory within the programmable computer. When the software system 50 is not operational, it is maintained within the data storage resource 20, which may be considered to generically represent one or more of a variety of data storage devices including floppy magnetic disks, optical disks, magnetic tapes, portable hard disks, and other apparatus.

Figure 2:
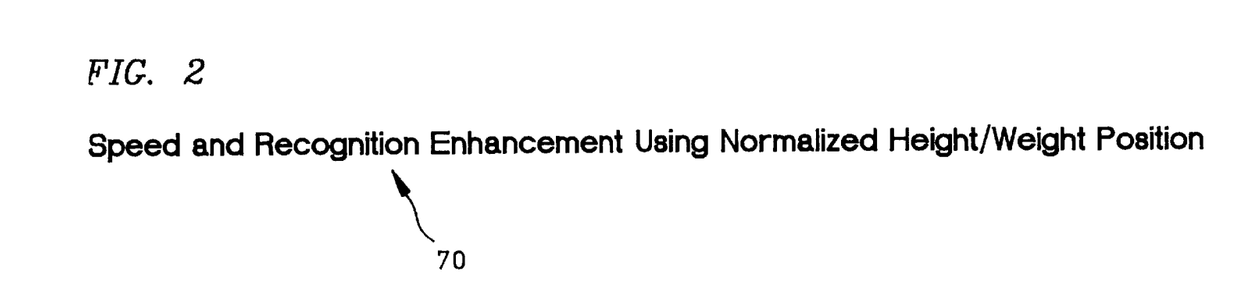
FIG. 2 is a an illustration of a line of printed text to be recognized.
Figure 3:
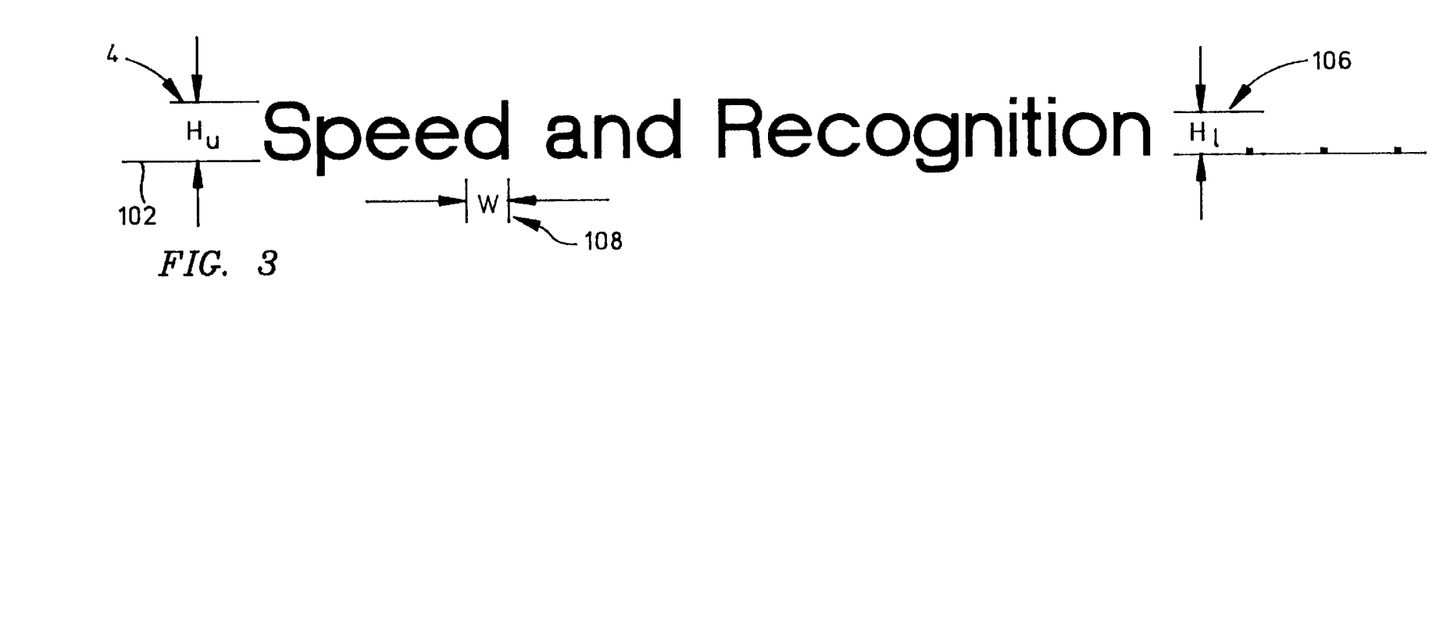
FIG. 3 illustrates the size parameters measured on a text line.

As described in more detail below, the software system 50 includes an executable instruction set for controlling the data processing apparatus for automatic recognition of characters formed as an array of characters on a sheet of printed text representing an input document 60. FIGS. 2 and 3 illustrate one line 70 of printed text which might appear in the input document 60 and require character recognition.

Figure 4A:
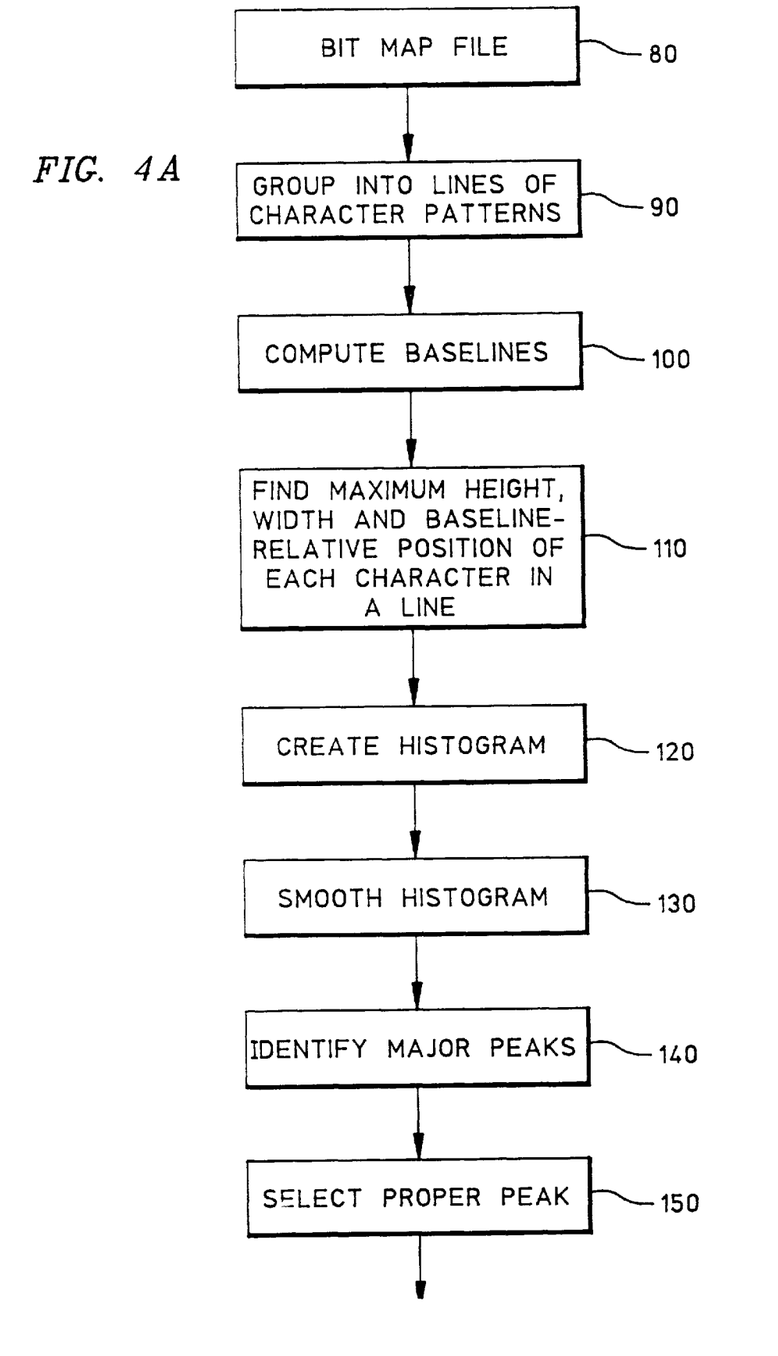
FIGS. 4A and 4B is a flow diagram showing an automated optical character recognition method performed in accordance with the present invention.
Figure 4B:
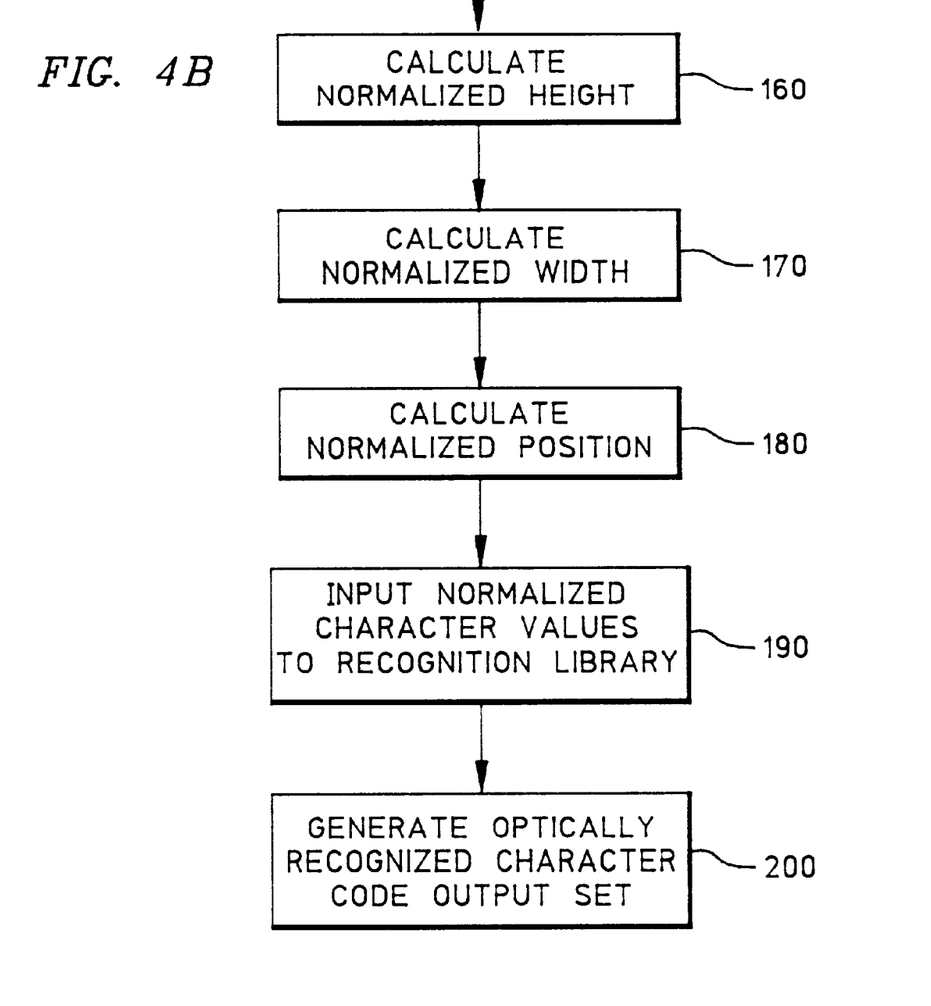

FIGS. 4A and 4B illustrate the steps to be performed in the optical character recognition method of the present invention. The method enhances the speed and recognition rate required for optically recognizing the characters in a line of text by dynamically normalizing such attributes as character height, character width and character position relative to a baseline reference using a standard attribute determined from the characters themselves. Step 80 of the method begins with a bit map file as input. The bit map file may exist in the data storage resource 20 or may be generated by and input directly from the optical scanning device 40. The optical scanning device 40 can be selected from several commercially available products capable of producing a bi-level (binary) image or "bit map" at a continuity that preserves visual quality when the image is displayed on a screen or reprinted on paper. The binary image or bit map is stored in the computer's random access memory, and/or the data storage resource 30, and defines a two dimensional array of 0's and 1's representing white and black, respectively. The 0's and 1's are in one to one correspondence with the cells of a grid that can be imagined to overlay the printed page. Because automatic methods for the interpretation of text are less discriminating than human recognition processes, the number of cells per unit area has to be greater than, for example, the resolution used in facsimile transmission of documents, which typically does not exceed 200 cells per inch. Resolutions of 300 samples per inch are suitable, however, and character recognition is not significantly improved with higher resolutions.

In step 90 of FIG. 4A, the OCR software system 50 operates on the input bit map data structure by segmenting the bit map array into single horizontal text lines for processing one line of characters at a time. Each line is processed as a sequence of binary input values representing one or more characters extracted from the array of characters resident on the input document 60 as a whole. The binary input values, being part of a two-dimensional array definition of the input characters, necessarily define one or more dimensional characteristics of the characters, such as character height, character width and character position relative to a baseline reference.

The baseline reference is calculated after text line segmentation in step 100 of FIG. 4A as a theoretical line passing through the bottom of a predetermined percentage of the characters. FIG. 3 illustrates a baseline reference 102 that has been estimated by the OCR software system 50. There are various known methods which may be utilized to calculate such a baseline and any one method could be utilized in conjunction with the present invention. Once the baseline information is obtained, character position (CP) (starting from the bottom of the characters) can be determined relative to the baseline as a character attribute in addition to character height and width. The nature of these dimensional characteristics is graphically illustrated in FIGS. 2 and 3. FIG. 2 illustrates the single line of text 70 reading "Speed and Recognition Enhancement Using Normalized Height/Width Position." FIG. 3 is a partially enlarged view of the text line 70 of FIG. 2. It illustrates the baseline reference 102, an uppercase height attribute ($H_u$) 104, a lowercase height attribute ($H_l$) 106 and a width attribute (W) 108.

In step 110 of FIG. 4A, the maximum character height, character width and character position relative to the baseline reference is calculated for each character of the input character line. The next step is to normalize these attribute values so that meaningful recognition comparisons can be made relative to a reference library database. Normalization is performed using a "standard" attribute such as character height. Standard height may be thought of as an estimate of the height of typical upper case characters. This estimation is based on the "mode" in a statistical sense, which is used in preference to the highest value or an average value of the text because the heights of ordinary upper case, numeric, and some lower case characters (such as "b","d" and "h") have a small variation and are fairly stable. It is preferable not to use a highest value because characters such as "/", "f" and "Q" have a larger variation and sometimes do not appear in a text line/paragraph/page. The average height is also unreliable because the value changes according to the relative frequency of characters.

At the point where standard height is calculated, the text baselines have been estimated and the size and position of the character patterns are known. Thus each character is represented for purposes of this stage by three positional measurements: w=width, h=height, and b=distance of the character bottom above the baseline. Standard height is calculated from a sequence of text assumed to be printed in only one font. The process thus estimates standard height for each line of text although standard height for a paragraph or page of text could also be used. If a line contains only a relatively small amount of text printed in a secondary font, the estimate of standard height need not be greatly affected, since the calculation is statistical in nature, as explained below.

The first step 120 (see FIG. 4A) in the calculation of standard height is to construct a histogram of character height. A size constraint is imposed so that very small characters such as hyphens are eliminated from the count. The result is a distribution graph 122, shown in FIG. 5, in which the "x" axis represents quantized character height ("h") and the "y" axis represents the frequency of occurrence ("f(h)") of the quantized height.

In step 130 (see FIG. 4A), this distribution is smoothed by summation to generate:

$$F(h)=f(h-1)+f(h)+f(h+1)$$

Figure 5:
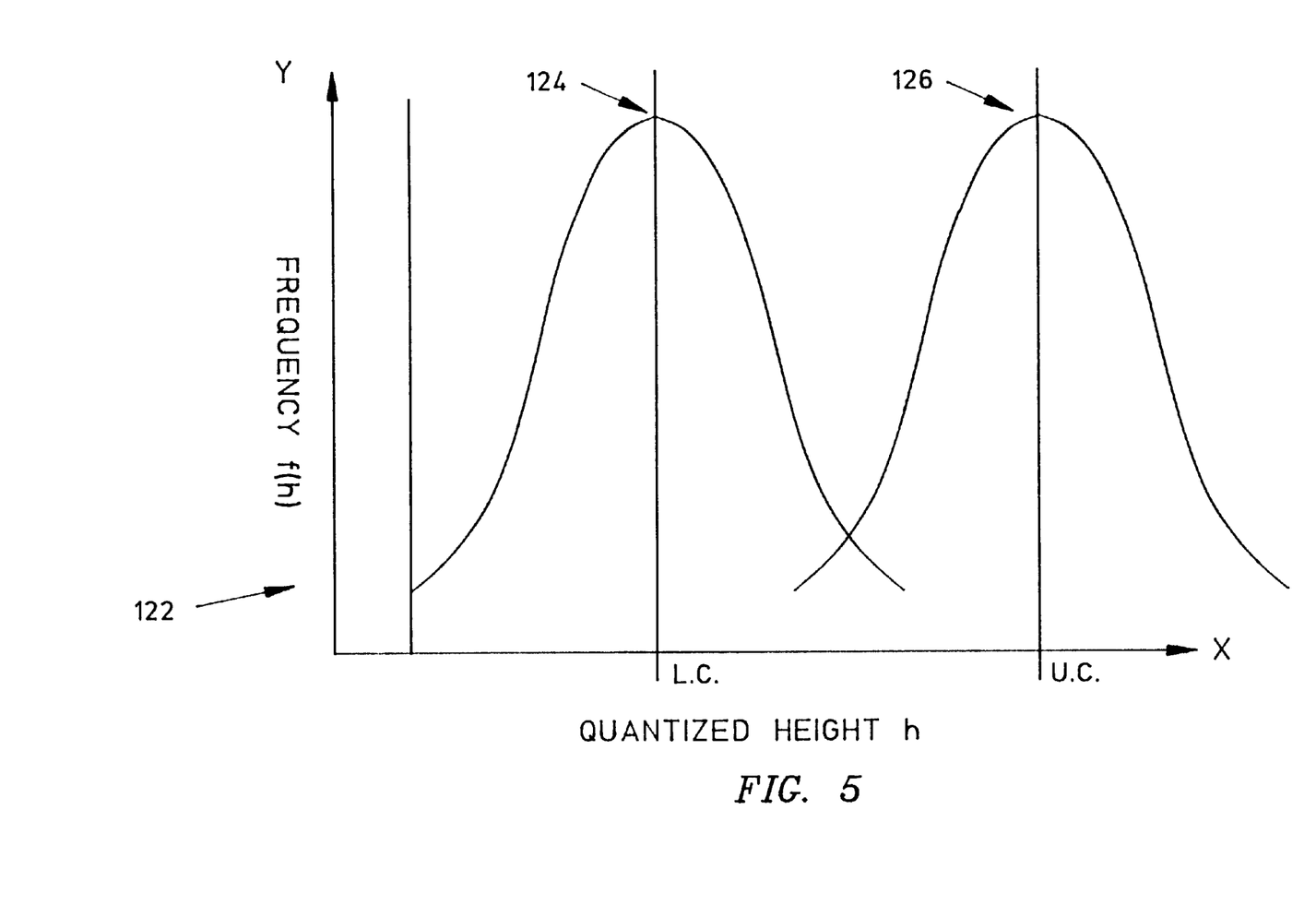
FIG. 5 is a frequency distribution graph showing quantized character height versus the frequency of the quantized height.

The hypothesis that governs the remainder of the normalization process is that the smoothed histogram F(h) is multimodal. Its two major peaks 124 and 126 (if both are present) correspond to tall characters such as capital letters or letters with ascenders at one value of height (peak 126), and another peak for small lower case letters such as 'a' or 'e' at a smaller value of height (peak 124). The process must also take into account the possibility that the text is printed in upper case only, i.e., that there is no lower case peak.

The major peaks are identified in step 140 of FIG. 4A. To do so, an initial peak h1 is first detected by determining the global maximum of F(h). This peak may be either the desired upper case peak (i.e., the desired standard height) or else the lower case peak. The peak identification step 140 thus proceeds to search for a second lower case peak h2 in the region:

$$h1*(1-d2)<h2<h1$$

and a third upper case peak h3, in the region:

$$h1<h3<h1*(1+d3)$$

The value d3 is a predetermined positive parameter representing an estimate of the largest factor by which upper case height can exceed lower case height over the range of fonts considered. This implies the relation:

$$d2=d3/(1+d3)$$

because $1/(1-d2)=(1+d3)/1$

The parameter d2 is the amount by which height can deviate from Height over the range of fonts considered. It is determined by simple math from d3 as follows:

IF: X=lower case and Y=upper case

THEN: $\frac{Y}{X} = 1 + d3$ and $\frac{X}{Y} = 1 - d2$

THEN: $\frac{1}{(1-d2)} = \frac{(1+d3)}{1}$

AND: $d2 = 1 - \frac{1}{(1+d3)} = \frac{1+d3}{(1+d3)} - \frac{1}{(1+d3)} = \frac{d3}{(1+d3)}$ Once found, the proper peak to use for standard height is calculated in step 150 of FIG. 4A by comparing the amplitude of the identified peaks ("f") to the total character count "N". To qualify as a valid peak, F(h2) or F(h3) must be at least 10% (or some other reliable percentage) of N. In view of the definition of F(h), this means that at least 10% of the character heights must be within plus or minus one pixel of h2 or h3. If h3 passes this test and has amplitude greater than that of h2, it is selected for standard height. Otherwise h1 is returned for standard height.

Once the standard height is obtained for a text line/paragraph/page, a set of normalized height/width/position values are calculated for each character in steps 160, 170 and 180 of FIG. 4B, as follows:
normalized height (NH)=height/standard height
normalized width (NW)=width/standard height normalized position (NP)=(½*height+bottom above base line)/standard height.

The normalized character values can be used as input to a pre-generated character recognition library of conventional design in step 190 of FIG. 4B for generating a character code output set to complete the optical recognition process in step 200 of FIG. 4B. The optical recognition process implemented using the normalized character values can take several forms. It is assumed that each character has some n-dimensional feature and it is classified by comparing the feature with a pre-generated recognition library (each library member or "template" has an n-dimensional feature and its category). The comparison could be made using Euclidian distance or by other known methods. The n-dimensional feature could also be replaced by other kinds of features such as a geometrical feature.

The n-dimensional feature vector used for comparisons between the input characters and the recognition library can be augmented using the normalized character values determined above as an extension of the vector. However, the normalized character values are perhaps best used to pre-screen the library recognition template patterns to eliminate patterns unlikely to yield a positive n-dimensional comparison. The recognition library is configured to include six additional features for use in pre-screening comparisons. They are: minimum normalized height, maximum normalized height, minimum normalized position, maximum normalized position, minimum normalized width and maximum normalized width. At first the normalized height, normalized position and normalized width are compared with the minimum and maximum values of each template (prototype) in the library (the order H-P-W is preferable, because width has the most variations and is least reliable among the three). If the value of the input character doesn't satisfy the pre-screening conditions, the template is immediately ignored. If the six comparisons are satisfied, the comparison of n-dimensional features is executed for detailed classification. It has been observed that the six parameter comparison reduces the number of candidates very quickly to less than half. It also excludes upper/lower case and apostrophe/comma confusion and increases the recognition rate.

Accordingly, a speed and recognition enhancement method for optical character recognition has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. An automated optical character recognition method for use on a programmable digital processing device, comprising the steps of:
   selecting a sequence of binary input values representing one or more characters in an array of characters to be optically recognized;
   determining from said sequence of binary input values one or more dimensional characteristics of said characters;
   generating a standard dimensional value determined from a frequency distribution of a selected one of said character dimensional characteristics;
   generating for each of said characters a set of normalized values determined from said standard dimensional value, said normalized values corresponding to said one or more character dimensional characteristics; and
   performing optical character recognition using said normalized values.

2. The method of claim 1 wherein said one or more characters are arranged on a single line of printed text.

3. The method of claim 1 wherein said input values are bit map representations of said characters.

4. The method of claim 1 wherein said dimensional characteristics include character height, character width and character position relative to a baseline reference.

5. The method of claim 1 wherein said standard dimensional value is a value representing standard character height.

6. The method of claim 1 wherein said frequency distribution is determined as a series of summations each representing a frequency of occurrence of a character height value determined from said input values.

7. The method of claim 1 wherein a standard dimensional value is selected from said frequency distribution as a standard uppercase character height, or if a predetermined insubstantial number of uppercase characters are present, as a standard lowercase character height.

8. The method of claim 1 wherein said normalized values include normalized character height, normalized character width, and normalized character position relative to a baseline reference.

9. The method of claim 1 wherein said optical character recognition includes a first classification step of comparing said normalized values with corresponding values in a pre-generated library of character prototype templates.

10. The method of claim 9 wherein said optical character recognition further includes a second classification step of determining an n-dimensional feature vector for said characters to be recognized and comparing said feature vector with corresponding n-dimensional features vectors in said library prototype template.

11. The method of claim 10 wherein first classification step includes comparing said normalized values with corresponding value ranges in said library prototype template.

12. The method of claim 11 wherein said normalized values include normalized character height (NH), normalized character width (NW) and normalized character position (NP) relative to a baseline reference, and wherein said first classification step includes comparing said normalized values with predetermined minimum and maximum library value ranges (minimum NH, maximum NH, minimum NW, maximum NW, minimum NP and maximum NP) to determine whether said normalized values fall within the minimum and maximum value ranges of said library prototype template.

13. The method of claim 12 wherein said normalized values are compared with said minimum and maximum value ranges in the order of NH, NP and NW, with the library prototype template being ignored upon one of said normalized values falling outside of said minimum and maximum value range.

14. The method of claim 13 wherein said second classification step compares selected features of said characters with a feature vector corresponding to said library prototype template.

15. The method of claim 14 wherein said selected features are n-dimensional features and are compared to said library feature vector using a distance method.

16. An automated optical character recognition method for use on a programmable digital processing device, comprising the steps of:
   selecting from an array of characters a sequence of characters to be recognized;

selecting an attribute of the members of said sequence of characters;

calculating for said sequence of characters a set of quantized attribute values corresponding to said selected attribute of the members of said sequence of characters;

determining from said set of attribute values a selected value to be used as an attribute value standard;

generating for said sequence of characters a set of normalized attribute values using said set of attribute values and said attribute value standard; and recognizing said sequence of characters using said set of normalized attribute values.

17. The method of claim 16 wherein said selected value determining step includes generating a frequency distribution representing the frequency of occurrence of each quantized attribute value calculated from said sequence of characters, and selecting an attribute value having the highest frequency value in said frequency distribution.

18. The method of claim 16 wherein said selected value determining step includes smoothing said frequency distribution.

19. The method of claim 18 wherein said smoothing is performed by adding to each frequency value a frequency value for the next lower quantized attribute value and a frequency value for the next higher quantized attribute value.

20. The method of claim 17 wherein said selected value determining step further includes (1) determining an initial frequency peak representing the quantized attribute value global maximum frequency for said frequency distribution, (2) searching for a second frequency peak within a predetermined attribute value range from said initial frequency peak, and if found (3) selecting as said attribute value standard an attribute value corresponding to said initial frequency peak if the attribute value of said second frequency peak is lower, or selecting as said attribute value standard an attribute value corresponding to said second frequency peak if that attribute value is higher than the attribute value of said initial frequency peak.

21. The method of claim 20 wherein said predetermined attribute value range represents an estimate of the largest factor by which upper case height can exceed lower case height over a range of fonts considered.

22. An automated optical character recognition system including:

means for selecting a sequence of binary input values representing one or more characters in an array of characters to be optically recognized;

means for determining from said sequence of binary input values one or more dimensional characteristics of said characters;

means for generating a standard dimensional value determined from a frequency distribution of a selected one of said character dimensional characteristics;

means for generating for each of said characters a set of normalized values determined from said standard dimensional value, said normalized values corresponding to said one or more character dimensional characteristics; and means for performing optical character recognition using normalized values.

23. The system of claim 22 wherein said one or more characters are arranged on a single line of printed text.

24. The system of claim 22 wherein said input values are bit map representations of said characters.

25. The system of claim 22 wherein said dimensional characteristics include character height, character width and character position relative to a baseline reference.

26. The system of claim 22 wherein said standard dimensional value is a value representing standard character height.

27. The system of claim 22 wherein said frequency distribution is determined as a series of summations each representing a frequency of occurrence of a character height value determined from said input values.

28. The system of claim 22 wherein standard dimensional value is selected from said frequency distribution as a standard uppercase character height, or if a predetermined insubstantial number of uppercase characters are present, as a standard lowercase character height.

29. The system of claim 22 wherein said normalized values include normalized character height, normalized character width, and normalized character position relative to a baseline reference.

30. The system of claim 22 wherein said means for performing optical character recognition includes a first classification means for comparing said normalized values with corresponding values in a pre-generated library of character prototype templates.

31. The system of claim 30 wherein said means for performing optical character recognition further includes a second classification means for determining an n-dimensional feature vector for said characters to be recognized and comparing said feature vector with corresponding n-dimensional feature vectors in said library prototype template.

32. The system of claim 31 wherein first classification means includes means for comparing said normalized values with corresponding value ranges in said library prototype template.

33. The system of claim 32 wherein said normalized values include normalized character height (NH), normalized character width (NW) and normalized character position (NP) relative to a baseline reference, and wherein said first classification means includes means for comparing said normalized values with predetermined minimum and maximum library value ranges (minimum NH, maximum NH, minimum NW, maximum NW, minimum NP and maximum NP) to determine whether said normalized values fall within the minimum and maximum value ranges of said library prototype template.

34. The system of claim 33 wherein said normalized values are compared with said minimum and maximum value ranges in the order of NH, NW and NP, with the library prototype template being ignored upon one of said normalized values falling outside of said minimum and maximum value range.

35. The system of claim 34 wherein said second classification means includes means for comparing selected features of said characters with a feature vector corresponding to said library prototype template.

36. The system of claim 35 wherein said selected features are n-dimensional features and are compared to said library feature vector using a distance method.

37. An automated optical character recognition system for use in a programmable digital processing device, comprising:

means for selecting from an array of characters a sequence of characters to be recognized;

means for selecting an attribute of the members of said sequence of characters;

means for calculating for said sequence of characters a set of quantized attribute values corresponding to said selected attribute of the members of said sequence of characters;

means for determining from said set of attribute values a selected value to be used as an attribute value standard;

means generating for said sequence of characters a set of normalized attribute values using said set of attribute values and said attribute value standard; and means for recognizing said sequence of characters using said set of normalized attribute values.

38. The system of claim 37 wherein said means for determining a selected value includes means for generating a frequency distribution representing the frequency of occurrence of each quantized attribute value calculated from said sequence of characters, and means for selecting an attribute value having the highest frequency value in said frequency distribution.

39. The system of claim 37 wherein said means for determining a selected value includes means for smoothing said frequency distribution.

40. The system of claim 39 wherein said means for smoothing includes means for adding to each frequency value a frequency value for the next lower quantized attribute value and a frequency value for the next higher quantized attribute value.

41. The system of claim 38 wherein said means for determining a selected value further includes means for (1) determining an initial frequency peak representing the quantized attribute value global maximum frequency for said frequency distribution, (2) searching for a second frequency peak within a predetermined attribute value range from said initial frequency peak, and if found (3) selecting as said attribute value standard an attribute value corresponding to said initial frequency peak if the attribute value of said second frequency peak is lower, or selecting as said attribute value standard an attribute value corresponding to said second frequency peak if that attribute value is higher than the attribute value of said initial frequency peak.

42. The system of claim 41 wherein said predetermined attribute value range represents an estimate of the largest factor by which upper case height can exceed lower case height over a range of fonts considered.

43. In an automated data processing apparatus including a central processing unit, a data storage memory, an input/output system including a document scanning device, and an optical character recognition system, a method for enhanced optical character recognition comprising the steps of:

scanning a document having printed character patterns thereon and generating binary array representations of said character patterns;

grouping said binary array character patterns into one or more sets representing linear arrays of sequentially positioned binary array character patterns;

selecting a dimensional characteristic of said character patterns to be analyzed;

determining a maximum dimensional value of said selected dimensional characteristic for each binary array character pattern in a set and calculating a frequency distribution of said maximum dimensional values for said set;

determining a global maximum dimensional value of said selected dimensional characteristic for said set;

generating normalized dimensional values for each binary array character pattern in said set using said global maximum dimensional value;

matching each binary array character patterns in said set by comparing said normalized dimensional values with one or more templates in a pre-generated character prototype library; and upon one of said templates matching, determining a character code value for each binary array character pattern in said set corresponding to a matching library template.

\* \* \* \* \*